United States Patent
Raftari et al.

(10) Patent No.: US 6,427,794 B1
(45) Date of Patent: Aug. 6, 2002

(54) ADAPTIVE DEMAGNETIZATION COMPENSATION FOR A MOTOR IN AN ELECTRIC OR PARTIALLY ELECTRIC MOTOR VEHICLE

(75) Inventors: Abbas Raftari; Patrick J. Curran, both of Northville; Vijay K Garg, Canton, all of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/682,533

(22) Filed: Sep. 17, 2001

(51) Int. Cl.$^7$ ................................................ B60K 6/04
(52) U.S. Cl. .................... 180/65.3; 180/65.2; 180/65.1
(58) Field of Search ........................ 180/65.3, 65.2, 180/65.1, 65.4, 65.8; 318/138, 254, 439; 701/22; 364/426.02; 320/118

(56) References Cited

U.S. PATENT DOCUMENTS

| | | | |
|---|---|---|---|
| 4,039,853 A | | 8/1977 | Koizumi et al. ............. 307/101 |
| 4,811,609 A | | 3/1989 | Nishibe et al. ............ 73/862.36 |
| 4,916,368 A | | 4/1990 | Onoda et al. ................ 318/723 |
| 5,291,960 A | * | 3/1994 | Brandenburg et al. ...... 180/65.2 |
| 5,339,012 A | * | 8/1994 | Schroedl et al. ............. 318/254 |
| 5,343,970 A | * | 9/1994 | Severinski .................. 180/65.2 |
| 5,345,761 A | * | 9/1994 | King et al. ................. 180/65.3 |
| 5,450,324 A | * | 9/1995 | Cikanek ................ 364/426.02 |
| 5,650,706 A | * | 7/1997 | Yamada et al. .............. 318/254 |
| 5,689,166 A | | 11/1997 | Nagayama et al. .......... 318/721 |
| 5,898,282 A | * | 4/1999 | Drozdz et al. .............. 180/65.4 |
| 6,051,951 A | * | 4/2000 | Arai et al. .................. 180/65.1 |
| 6,242,873 B1 | * | 6/2001 | Drozdz et al. .............. 180/65.1 |
| 6,275,004 B1 | * | 8/2001 | Tamai et al. ................. 320/118 |
| 6,318,487 B2 | * | 11/2001 | Yanase et al. .............. 180/65.2 |

* cited by examiner

*Primary Examiner*—Lanna Mai
*Assistant Examiner*—Hau Phan
(74) *Attorney, Agent, or Firm*—Carlos Hanze

(57) ABSTRACT

In an electric or hybrid electric vehicle, a voltage monitor (102) is directly coupled to a traction motor (38) and/or generator motor (30) to detect a permanent magnet induced voltage within the motor at a predetermined speed and no load condition (300). A controller (100) compares the detected permanent magnet induced voltage with an expected reference voltage that represents an expected permanent magnet induced voltage at full magnetization and the predetermined speed (302). The controller produces an indication of magnetization based on the reference voltage, the detected permanent magnet induced voltage, and the predetermined speed. If the indication of magnetism reaches a predetermined threshold, the motor is made inoperable and/or a current to the motor is limited to prevent damage to components (306, 308, 310, 312, 314). Preferably, a user of the vehicle is made aware of these actions by an audible and/or visual indicator (308, 314). If available, another source of motive power is substituted for the motor that is made inoperable (316).

2 Claims, 3 Drawing Sheets

ADAPTIVE DEMAGNETIZATION COMPENSATION FOR A MOTOR IN AN ELECTRIC OR PARTIALLY ELECTRIC MOTOR VEHICLE

CROSS REFERENCE TO RELATED APPLICATIONS

This application is related to and disclosure with commonly assigned prior U.S. patent application Ser. No. 09/849,576, filed May 4, 2001 by Vijay K. Garg et al., entitled "Permanent Magnet Degradation Monitoring for Hybrid and Electric Vehicles," the disclosure of which prior application is hereby incorporated by reference, verbatim and with the same effect as though it were fully and completely set forth herein. Also, this application is related to and shares disclosure with commonly assigned U.S. patent application Ser. No. 09/682,534, filed Sep. 7, 2001 by Abbas Rafteri et al., entitled "Adaptive Demagnetization Compensation for a Motor in an Electric or Partially Electric Motor Vehicle," the disclosure of which application is hereby incorporated by reference, verbatim and with the same effect as though it were fully and completely set forth herein. Also, this application is related to and shares disclosure with commonly assigned U.S. patent application Ser. No. 09/682,529, filed Sep. 14, 2001 by Abbas Rafteri et al., entitled "Adaptive Demagnetization Compensation for a Motor in an Electric or Partially Electric Motor Vehicle," the disclosure of which application is hereby incorporated by reference, verbatim and with the same effect as though it were fully and completely set forth herein. Also, this application is related to and shares disclosure with commonly assigned U.S. patent application Ser. No. 09/682,531, filed Sep. 17, 2001 by Abbas Rafteri et al., entitled "Fault Identification Due to Demagnetization for a Motor in an Electric or Partially Electric Motor Vehicle," the disclosure of which application is hereby incorporated by reference, verbatim and with the same effect as though it were fully and completely set forth herein.

BACKGROUNDS OF THE INVENTION

1. Field of the Invention

The present invention relates generally to hybrid electric vehicles (HEV) and electric vehicles, and specifically to compensation due to permanent magnet degradation in motors/generators in hybrid electric and electric vehicles.

2. Discussion of the Prior Art

The need to reduce fossil fuel consumption and emissions in automobiles and other vehicles predominately powered by internal combustion engines (ICEs) is well known. Vehicles powered by electric motors attempt to address these needs. Another alternative known solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. In one configuration, the electric motor drives one set of wheels and the ICE drives a different set. Other, more useful, configurations exist. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "powersplit" configuration. In one of several types of PSHEV configurations, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The generator motor and the traction motor include permanent magnets. These permanent magnets may demagnetize by accident and may degrade or demagnetize over time due to temperature, high current ripples, power ripples, vibration and aging. The demagnetization may degrade vehicle performance such as output power/torque and efficiency. Indeed, the demagnetization may reach a point where safety becomes an issue. More specifically, demagnetization may result in less torque being available to drive the wheels at a critical point, for example, to pass a vehicle. And, demagnetization may result in less energy being available for regenerative braking, which may adversely affect stopping distance/time.

U.S. Pat. No. 5,650,706 issued to Yamada et al. ("Yamada") is directed to a control device for a salient pole type permanent magnet motor. The object of that device is to prevent torque from lowering due to demagnetization of the magnet. A magnetic flux of the permanent magnet is calculated or inferred by determining an electromotive force of the permanent magnet in accordance with a voltage and current supplied to the permanent magnet motor, a rotational speed of the motor, and an inductance of the permanent magnet motor. This electromotive force is compared to a reference electromotive force representative of a fully magnetized permanent magnet. This process is complex and cumbersome. Direct detection of demagnetization is suggested in Yamada by using certain sensors, such as a Hall device or a magnetoresistance element. These direct detection methods suggested in Yamada are relatively expensive and impact serviceability due to location of a complex sensor in the motor housing. Also, demagnetization beyond a safety limit is not monitored and reported for safety-related actions.

Therefore, a need exists for an improved method and apparatus for monitoring and compensating for permanent magnet degradation.

SUMMARY OF INVENTION

Accordingly, an object of the present invention is to provide a monitor for permanent magnet degradation for an electric or a hybrid electric vehicle (HEV).

Another object of the present invention is to provide a safe and direct method for determining the magnetic flux of a permanent magnet in a motor.

Yet another object of the present invention is to determine a state of magnetism of a permanent magnet to adjust a torque of a motor in a vehicle.

Yet another object of the present invention is to provide adaptive strategies to compensate for permanent magnet degradation, including protection of components, limited operation, and notification of permanent magnet degradation to a user of the vehicle.

Other objects of the present invention will become more apparent to persons having ordinary skill in the art to which the present invention pertains from the following description taken in conjunction with the accompanying figures.

In accordance with one aspect of the present invention, a device is provided for compensating for permanent magnet degradation in a motor. The device includes a voltage monitor that detects a permanent magnet induced voltage within the motor at a predetermined speed and no load condition. The voltage monitor is coupled to a processor that receives the permanent magnet induced voltage and compares the permanent magnet induced voltage to a reference voltage that reflects the permanent magnet induced voltage for the motor with a fully magnetized permanent magnet. The processor determines an indication of magnetism of the permanent magnet as a function of the detected permanent magnet induced voltage, the reference voltage, and the predetermined speed. If the indication of magnetism reaches a predetermined threshold, the motor is made inoperable and/or a current to the motor is limited to prevent damage to components. Preferably, an audible and/or visual indicator notifies a user of the vehicle that the motor has been rendered inoperable or is operating in a limited mode. Preferably, another source of motive power, for example, another motor or an internal combustion engine or a combination of these, is substituted for the motor that is made inoperable.

In accordance with another aspect of the present invention, a method is provided for adapting to permanent magnet degradation in a motor of a vehicle. First a permanent magnet (PM) induced voltage of a motor is detected. Preferably, the permanent magnet induced voltage is detected by inducing a voltage in coils wrapped around the stator teeth of a motor. The voltage is induced at a predetermined speed by the rotation of a rotor that includes the permanent magnets. The detected permanent magnet induced voltage is compared to a reference voltage that reflects full magnetism of the permanent magnets at the predetermined speed. An indication of magnetism of the permanent magnets is produced as a function of the detected permanent magnet induced voltage, the reference voltage and the predetermined speed. If the indication of magnetism reaches a predetermined threshold, the motor is made inoperable and/or a current to the motor is limited to prevent damage to components. Preferably, an audible and/or visual indicator notifies a user of the vehicle that the motor has been rendered inoperable or is operating in a limited mode. Preferably, another source of motive power, for example, another motor or an internal combustion engine or a combination of these, is substituted for the motor that is made inoperable.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

Figure 1:
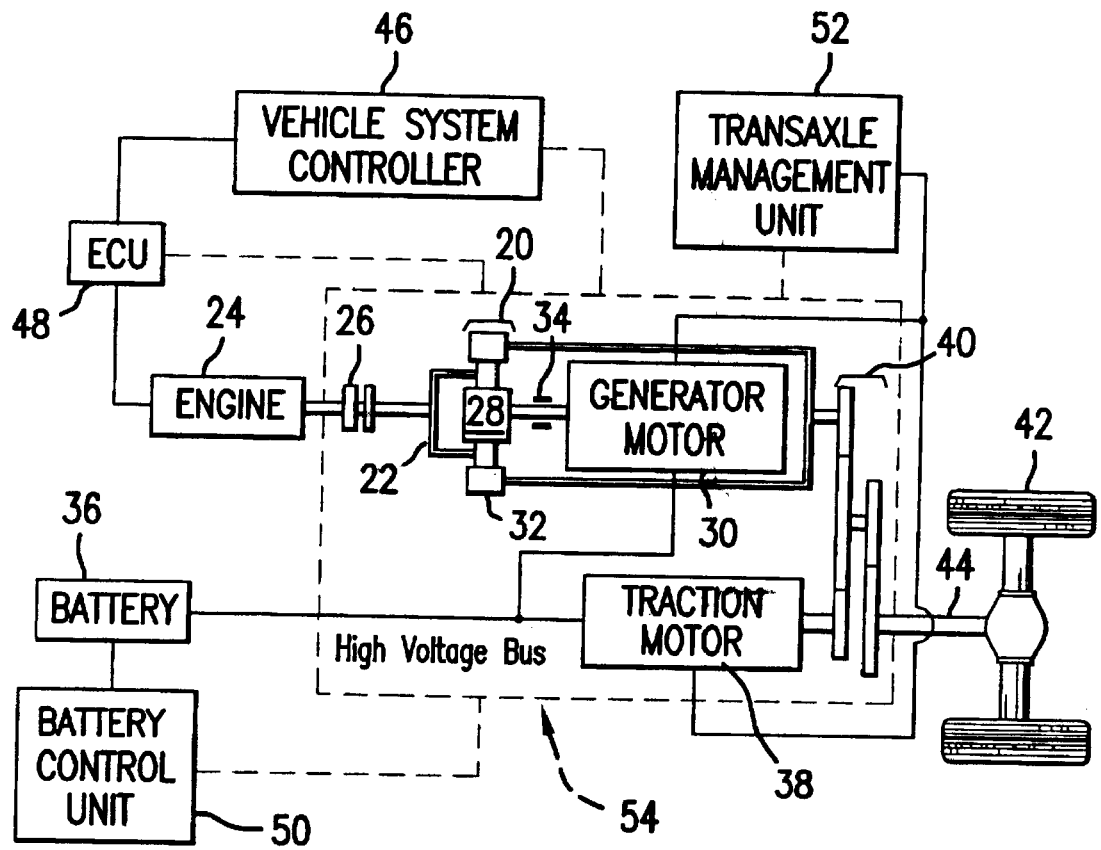
FIG. 1 is a block diagram illustrating a hybrid electric vehicle (HEV) configuration in accordance with a preferred embodiment of the present invention.

The present invention relates to electric vehicles and, more particularly, hybrid electric vehicles (HEVs). FIG. 1 illustrates a parallel/series hybrid electric vehicle (powersplit) configuration in accordance with the present invention.

In the HEV of FIG. 1, a planetary gear set 20 mechanically couples a carrier gear 22 to an engine 24 via a one way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20 splits the engine output energy into a series path from the engine 24 to the generator motor 30 and a parallel path from the engine 24 to the drive wheels 42. Engine speed can be controlled by varying the split to the series path while maintaining the mechanical connection through the parallel path. The traction motor 38 augments the engine power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. The ECU 48 and VSC 46 can be housed in the same unit, but are preferably separate controllers. The VSC 46 communicates with the ECU 48, as well as a battery control unit (BCU) 50 and a transaxle management unit (TMU) 52 through a communication network, such as a controller area network (CAN) 54. The BCU 50 connects to the battery 36 via a hardwire interface. The TMU 52 controls the generator motor 30 and traction motor 38 via a hardwire interface. More specifically, TMU 52 includes a controller that executes a stored program to determine the torque of generator motor 30 and traction motor 38. Also, in accordance with the present invention, TMU 52 detects and stores an indication of the magnetization of permanent magnets in generator motor 30 and traction motor 38. In particular, a voltage sensor incorporated in generator motor 30 and a voltage sensor in traction motor 38 determine a voltage that is proportional to the magnetization of permanent magnets in generator motor 30 and traction motor 38, as described below. Also, in accordance with the present invention, TMU 52 controls motor torque and current, motor operation, and initiates warnings to a user of the vehicle.

Figure 2:
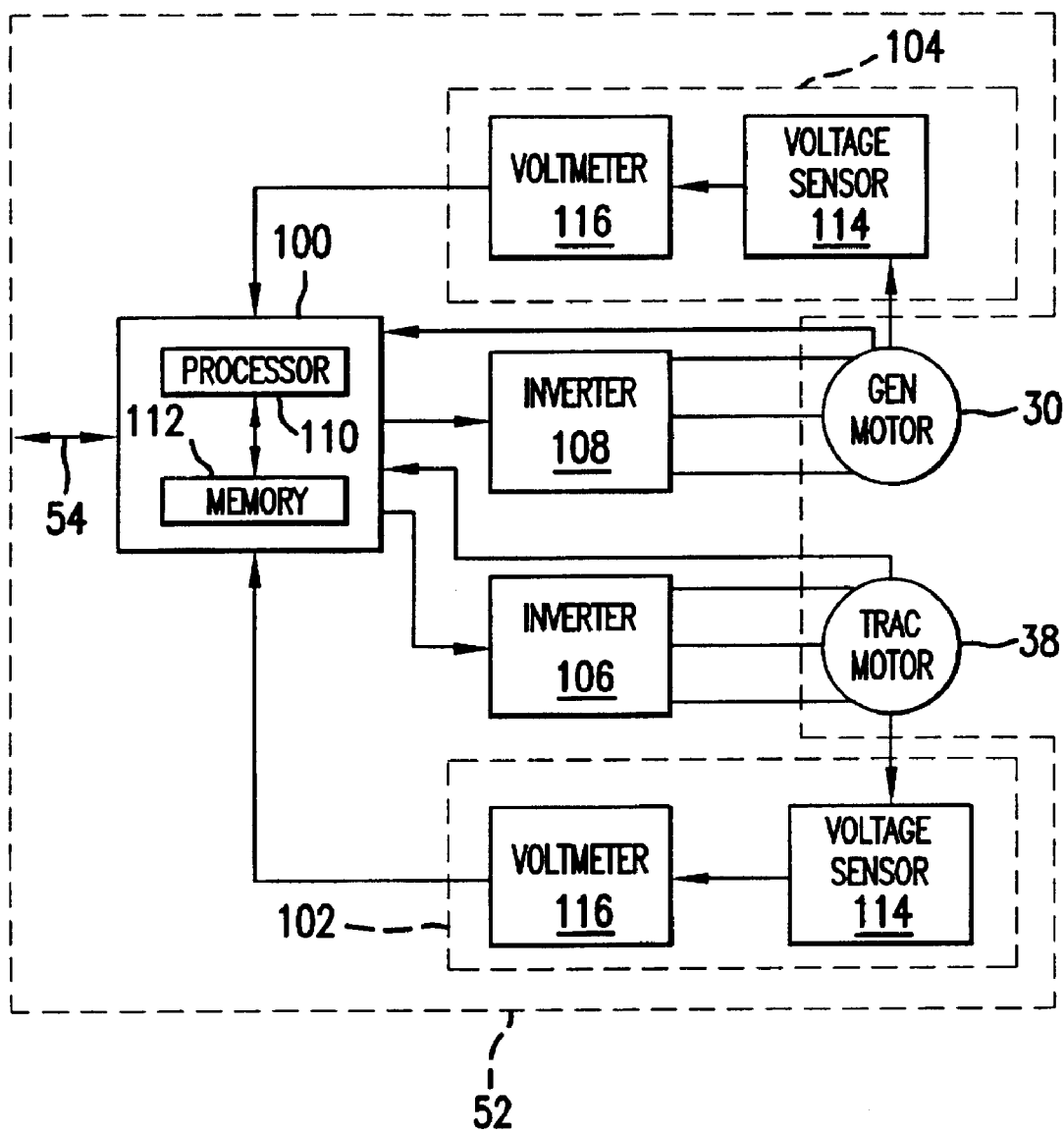
FIG. 2 is a block diagram of a transaxle management unit in accordance with a preferred embodiment of the present invention.

FIG. 2 is a block diagram of a portion of transaxle management unit 52 shown interfaced to generator motor 30 and traction motor 38 in accordance with a preferred embodiment of the present invention. TMU 52 preferably includes a controller 100, a voltage monitor 102, a voltage monitor 104, an inverter 106 and an inverter 108. Inverter 106 is coupled to traction motor 38 to provide a three-phase AC current to traction motor 38. The three-phase AC current is derived from a DC current from battery 36. Similarly, inverter 108 is coupled to generator motor 30 to provide a three-phase AC current to generator motor 30. The three-phase AC current is also derived from a DC current from battery 36. Inverter 106 an inverter 108 are coupled to controller 100 such that controller 100 provides input signals to inverters 106,108 to determine a current provided to generator motor 30 and traction motor 38, respectively. In accordance with the present invention, a voltage monitor 102 is coupled to traction motor 38 to determine a permanent magnet induced voltage of traction motor 38. Similarly, a voltage monitor 104 is coupled to generator motor 30 to determine permanent magnet induced voltage in generator motor 30. The permanent magnet induced voltages from traction motor 38 and generator motor 30 are used by controller 100 to determine a state of the permanent magnets contained within traction motor 38 and generator motor 30. Based on the state of the permanent magnets in traction motor 38 and generator motor 30, controller 100 determines a current provided by inverters 106, 108 determines whether the traction motor 38 or generator motor 30 are operable; and initiates warnings to a user.

Controller 100 preferably includes a processor 110 and a memory 112. Processor 110 comprises one or more microprocessors, micro-controllers, or the like. Controller 100 preferably executes a stored program to determine, store and transmit an indication of the state of magnetism of the permanent magnets contained within generator motor 30 and traction motor 38. Also, controller 100 preferably executes a stored program to determine actions to be taken based on the state of magnetism of the permanent magnets contained within generator motor 30 and traction motor 38. Most preferably, memory 112 includes a non-volatile memory component that stores an indication of the state of magnetism of the permanent magnets in generator motor 30 and traction motor 30.

Voltage monitors 102,104 preferably include a voltage sensor 114 and a voltmeter 116. Voltage sensor 114 is directly coupled to its respective motor to determine a permanent magnet induced voltage at a predetermined speed of the motor 38. The voltmeter 116 provides the voltage from voltage sensor 114 to controller 100 for use in determining the state of magnetism of the permanent magnets in generator motor 30 and traction motor 38. Preferably, the voltmeter is housed external to the motor. Most preferably, the voltmeter is hardware available on the vehicle that is reused for the magnetization monitoring function, which function is only required periodically.

Figure 3:
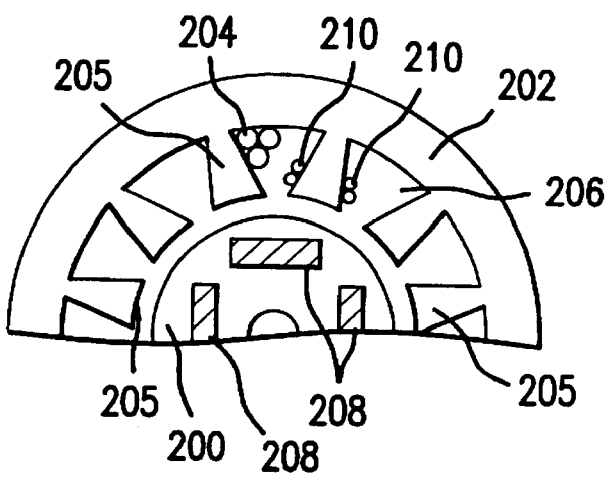
FIG. 3 is a cross sectional view of a motor in accordance with a preferred embodiment of the present invention.

FIG. 3 is a sectional view of generator motor 30 including a preferred voltage sensor in accordance with the present invention. A similar arrangement is preferred for traction motor 38. Generator motor 30 includes a rotor 200 and a stator 202. Permanent magnets 208 are mounted within rotor 200. The motor windings 204 (as exemplary shown between two stator teeth) are wrapped around the teeth 205 in slots 206 in stator 202 in the traditional manner. In accordance with the invention, a sensor coil 210 is wrapped around the teeth 205 in slots 206 in stator 202. As shown in FIG. 3, sensor coil 210 is preferably located adjacent rotor 200 at an edge of the teeth 205 closest to a gap between stator 202 and rotor 200. Preferably, sensor coil 210 comprises a wire having a very high gauge and a few turns. The sensor coil 210 is coupled to voltmeter 116 and serves as a voltage sensor 114. Sensor coil 210 is used to determine a permanent magnet induced voltage in generator 30. More specifically, when no current is running through motor windings 204, a voltage is induced in sensor coil 210 due to the rotation of rotor 200 and a magnetic field generated by permanent magnets 208. This voltage is sensed by voltmeter 116 and is transmitted to controller 100.

Figure 4:
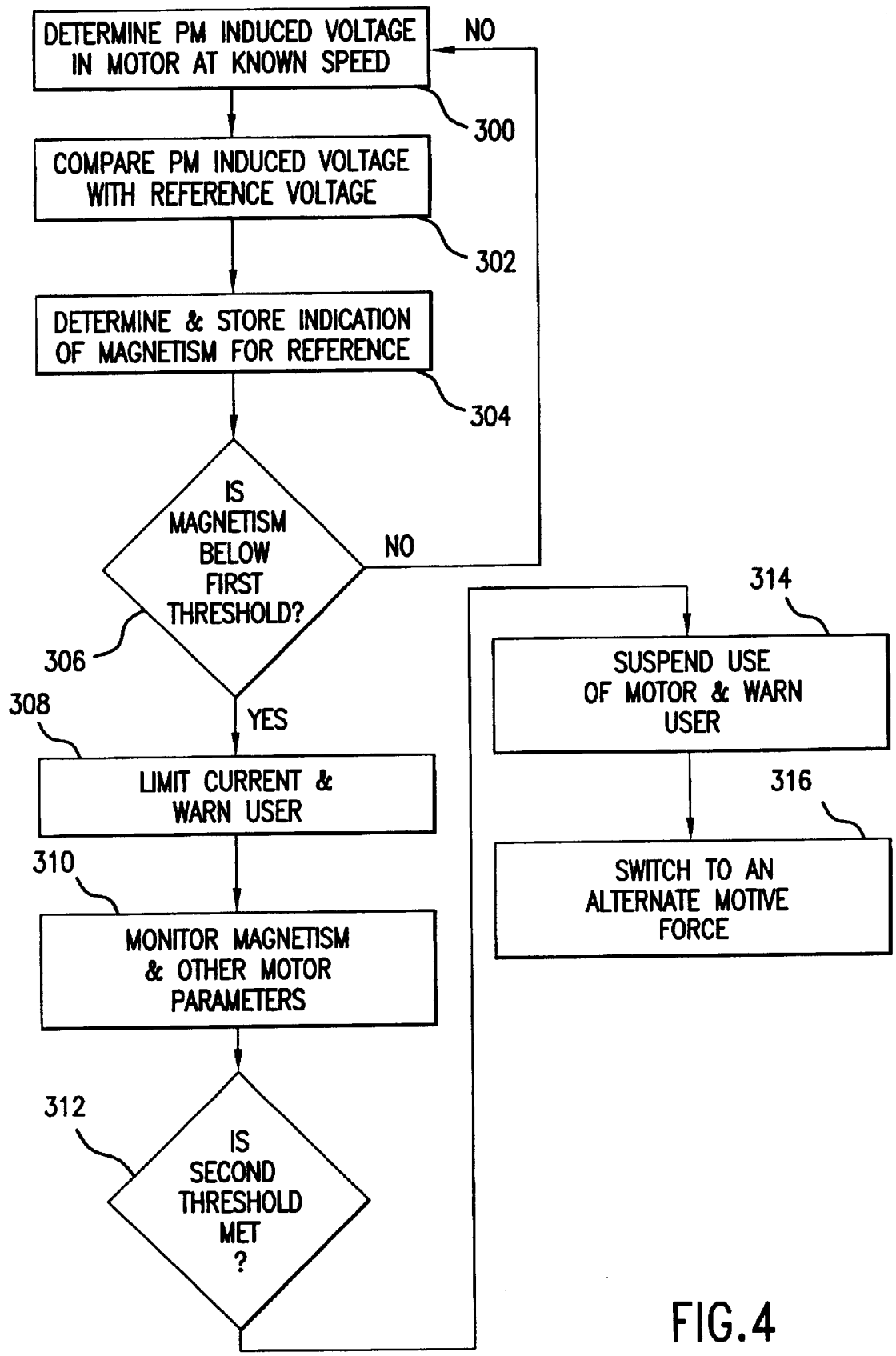
FIG. 4 is a flow diagram illustrating a method of detecting and adapting to permanent magnetism degradation in accordance with a preferred embodiment of the present invention.

FIG. 4 is a flow diagram illustrating a method for determining and compensating for permanent magnet degradation in a motor in accordance with the present invention. The method is described below with reference to the preferred embodiments described above in FIGS. 1–3.

First, the permanent magnet induced voltage of the motor is determined (300). In the preferred embodiment, this is accomplished by inducing a voltage in sensor coil 210 during a period of time when no current is flowing in the motor windings; i.e., there is no load. Preferably, voltmeter 116 quantifies the voltage induced in the sensor coil 210. The no load condition occurs when there is zero current in the stator windings of the motor. For example, the no load condition occurs when the vehicle is at idle, for example, stopped at a stop light, and also, when the vehicle is at cruising speed and there is no current in the motor windings. Another exemplary no load condition occurs when the generator motor is not supplying any torque to the wheels or receiving torque from the engine to charge the batteries. The PM induced voltage is preferably induced by the rotation of rotor 200, including permanent magnets 208. This causes a magnetic field that induces the voltage in the sensor coil. Most preferably, rotor 200 is rotated at a predetermined speed and the inverter contacts that supply current to the motor are opened during permanent magnet induced voltage measurement. The TMU 52, and more specifically, controller 100 determines when to measure the permanent magnet induced voltage in light of the state of the vehicle, which state is preferably obtained via controller area network 54 or any other suitable means.

The permanent magnet induced voltage is proportional to the magnetic field (flux) and the speed of rotation of the rotor. Hence, the strength of the permanent magnet is readily obtained where the speed and permanent magnet induced voltage are known.

After the permanent magnet induced voltage is detected, the permanent magnet induced voltage is compared to a reference voltage that reflects a permanent magnet induced voltage at no demagnetization and the same predetermined speed at which the permanent magnet induced voltage is detected (302). That is, the reference voltage is the value expected for the permanent magnet induced voltage if the permanent magnet is fully magnetized. Preferably, the reference voltage is stored in TMU 52. Any difference between the reference voltage and the detected permanent magnet induced voltage is used to determine an indication of the amount of degradation of the permanent magnet. This indication is preferably stored in a nonvolatile memory for further reference (304). Also, the indication of magnetic strength is compared to a first threshold to determine if the permanent magnet has reached a point of degradation where additional precautions should be taken (306). Most preferably, if the magnetic strength is below a predetermined first threshold, an indication is made to a user of the vehicle, for example, through an audible or visual indication that is transmitted via controller area network 54 (308). Also, the current to the motor is limited to an amount that prevents damage to components of the vehicle (308) and/or the TMU 52 is calibrated to more accurately drive the inverter to force the motor to provide the torque required. Most preferably, the first threshold is chosen such that at least limited operation of the vehicle is possible. During a period of continued limited operation, permanent magnet degradation along with other motor parameters, such as temperature, are monitored (310). The results from further monitoring (310), are compared to a second threshold (312). This threshold is alternatively a level of magnetism, a certain temperature, or another monitored parameter. If the second threshold is not met (312), then monitoring continues (310). If the second threshold is met (312), then subsequent motor operation is suspended and a user of the vehicle is warned with an audible or visual indicator (314). Where another source of motive power is available, operation of the wheels of the vehicle is switched to that motive source (316). For example, in the preferred embodiment of FIG. 1, if the generator motor 30 is made inoperable due to permanent magnet degradation, then wheels 42 are operated under control of traction motor 38. Alternatively, if traction motor 38 is made inoperable due to permanent magnet degradation, then wheels 42 are operated under control of generator motor 30 and engine 24. Most preferably, if the traction motor 38 is inoperable, generator motor 30 is first used to bring wheels 42 to a certain speed, and then engine 24 is activated to provide additional motive force via a smooth transition.

In preferred alternatives to the method described above with respect to FIG. 3, the first and second thresholds are varied to be the same or one or the other is ignored. For example, steps 306, and 308 may be eliminated such that a threshold measure of magnetism (312) immediately causes the motor to be made inoperable (314). Alternatively, steps 310, 312, 314 and 316 may be eliminated if magnet degradation does not result in inoperability or unsafe conditions.

As discussed above, the present invention provides a simple and effective method of determining the state of magnetism of a permanent magnet in a motor of a vehicle. Advantageously, the state of magnetism is compared with a safety threshold and an indication of safety problems is made available to a user of the vehicle. Also, the state of magnetism is used to calibrate a torque from the motor, limit a current to the motor, suspend motor operation, or switch to an alternative motive force.

The above-described embodiments of the invention are provided purely for purposes of example. Many other variations, modifications, and applications of the invention may be made.

What is claimed is:

1. A hybrid electric vehicle comprising:

a traction motor;

a generator motor;

a first voltage monitor coupled to the traction motor to determine a first permanent magnet induced voltage of the traction motor;

a second voltage monitor coupled to the generator motor to determine a second permanent magnet induced voltage of the generator motor;

a controller that:

compares the first permanent magnet induced voltage with a first reference voltage that reflects an expected permanent magnet induced voltage for the traction motor when a permanent magnet of the traction motor is fully magnetized;

compares the second permanent magnet induced voltage with a second reference voltage that reflects an expected permanent magnet induced voltage for the generator motor when a permanent magnet of the generator motor is fully magnetized;

determines a state of magnetism of the permanent magnet of the traction motor based on the first permanent magnet induced voltage, the first reference voltage and a predetermined speed at which the first permanent magnet induced voltage is determined;

determines a state of magnetism of the permanent magnet of the generator motor based on the second permanent magnet induced voltage, the second reference voltage, and a predetermined speed at which the second permanent magnet induced voltage is determined; and adjusts a current to at least one of the generator motor and the traction motor based on at least one of the state of magnetism of the generator motor and the state of magnetism of the traction motor.

2. The vehicle of claim 1 wherein the first voltage monitor comprises a sensor coil that detects the first permanent magnet induced voltage that is induced by rotation of a rotor that includes the permanent magnet of the traction motor and wherein the second voltage monitor comprises a sensor coil that detects the second permanent magnet induced voltage that is induced by rotation of a rotor that includes the permanent magnet of the generator motor.

* * * * *